US012077105B2

(12) United States Patent
Persson

(10) Patent No.: US 12,077,105 B2
(45) Date of Patent: Sep. 3, 2024

(54) LINING FOR ON-ROAD TRUCK BODY

(71) Applicant: Metso Outotec Finland Oy, Tampere (FI)

(72) Inventor: Henrik Persson, Trelleborg (SE)

(73) Assignee: Metso Outotec Finland Oy, Tampere (FI)

( * ) Notice: Subject to any disclaimer, the term of this patent is extended or adjusted under 35 U.S.C. 154(b) by 87 days.

(21) Appl. No.: 17/779,234

(22) PCT Filed: Nov. 24, 2020

(86) PCT No.: PCT/EP2020/083205
§ 371 (c)(1),
(2) Date: May 24, 2022

(87) PCT Pub. No.: WO2021/105120
PCT Pub. Date: Jun. 3, 2021

(65) Prior Publication Data
US 2023/0001862 A1  Jan. 5, 2023

(30) Foreign Application Priority Data
Nov. 25, 2019 (SE) .................................. 1951343-1

(51) Int. Cl.
*B60R 13/01* (2006.01)
*B62D 33/033* (2006.01)
(52) U.S. Cl.
CPC ............ *B60R 13/01* (2013.01); *B62D 33/033* (2013.01); *B60R 2013/015* (2013.01); *B60R 2013/018* (2013.01)
(58) Field of Classification Search
CPC .............. B60R 13/01; B60R 2013/015; B60R 2013/018; B62D 33/033; B62D 33/00;
(Continued)

(56) References Cited

U.S. PATENT DOCUMENTS 3,578,375 A * 5/1971 Finefrock ............... B60R 13/01
52/177
4,333,678 A * 6/1982 Munoz .................... B60R 13/01
220/4.28
(Continued)

FOREIGN PATENT DOCUMENTS

CA        2086058 A1    6/1994
DE        2010630 A1   11/1971
(Continued)

OTHER PUBLICATIONS

Office Action for corresponding Swedish Patent Application No. 1951343-1 dated Sep. 22, 2021.
(Continued)

*Primary Examiner* — Amy R Weisberg
*Assistant Examiner* — Sara Laghlam
(74) *Attorney, Agent, or Firm* — Andrus Intellectual Property Law, LLP

(57) ABSTRACT

An on-road truck body lining for protecting an on-road truck body from wear. The on-road truck body lining includes a plurality of main lining elements and a plurality of edge lining elements arranged to be fixated to the on-road truck body. Each of the main lining element includes a load facing portion, one or more transition sides each adapted to meet a corresponding transition side of an adjacent edge lining element and a truck body facing portion, arranged opposite to the load facing portion. The truck body facing portion includes one or more end portions protruding from a respective transition side of the load facing portion such that the one or more end portions of the truck body facing portion are each arranged to be covered by a respective adjacent edge lining element such that the respective adjacent edge lining element, upon being fixated, clamps the main lining element to the on-road truck body.

26 Claims, 7 Drawing Sheets

(58) Field of Classification Search
CPC ..... B62D 25/2072; B62D 33/02; B60P 1/286;
B60P 1/28
See application file for complete search history.

(56) References Cited

U.S. PATENT DOCUMENTS

| | | | | |
|---|---|---|---|---|
| 5,312,162 | A * | 5/1994 | Baebel | ............... B60P 1/283 |
| | | | | 105/423 |
| 9,868,405 | B1 * | 1/2018 | Fischer | ............... B60R 13/01 |
| 2003/0094829 | A1 * | 5/2003 | Gardiner | ............ B62D 33/00 |
| | | | | 296/39.2 |
| 2004/0212209 | A1 * | 10/2004 | Vitoorapakorn | ........ B60R 13/01 |
| | | | | 296/39.2 |
| 2014/0327265 | A1 | 11/2014 | Burstrom et al. | |
| 2016/0194035 | A1 * | 7/2016 | Lu | ..................... B60R 13/01 |
| | | | | 296/39.2 |

FOREIGN PATENT DOCUMENTS

| | | |
|---|---|---|
| JP | H07246958 A | 9/1995 |
| JP | 2015123766 A * | 7/2015 |
| WO | 2013091007 A1 | 6/2013 |
| WO | 2020120602 A1 | 6/2020 |

OTHER PUBLICATIONS

Search Report for priority Swedish Application No. 1951343-1 mailed Jun. 1, 2020.
International Search Report and Written Opinion for International Application No. PCT/EP2020/083205 mailed Feb. 25, 2021.
Search Report and Office Action for Swedish Patent Application No. 2351409-4, mailed Jun. 20, 2024.

* cited by examiner

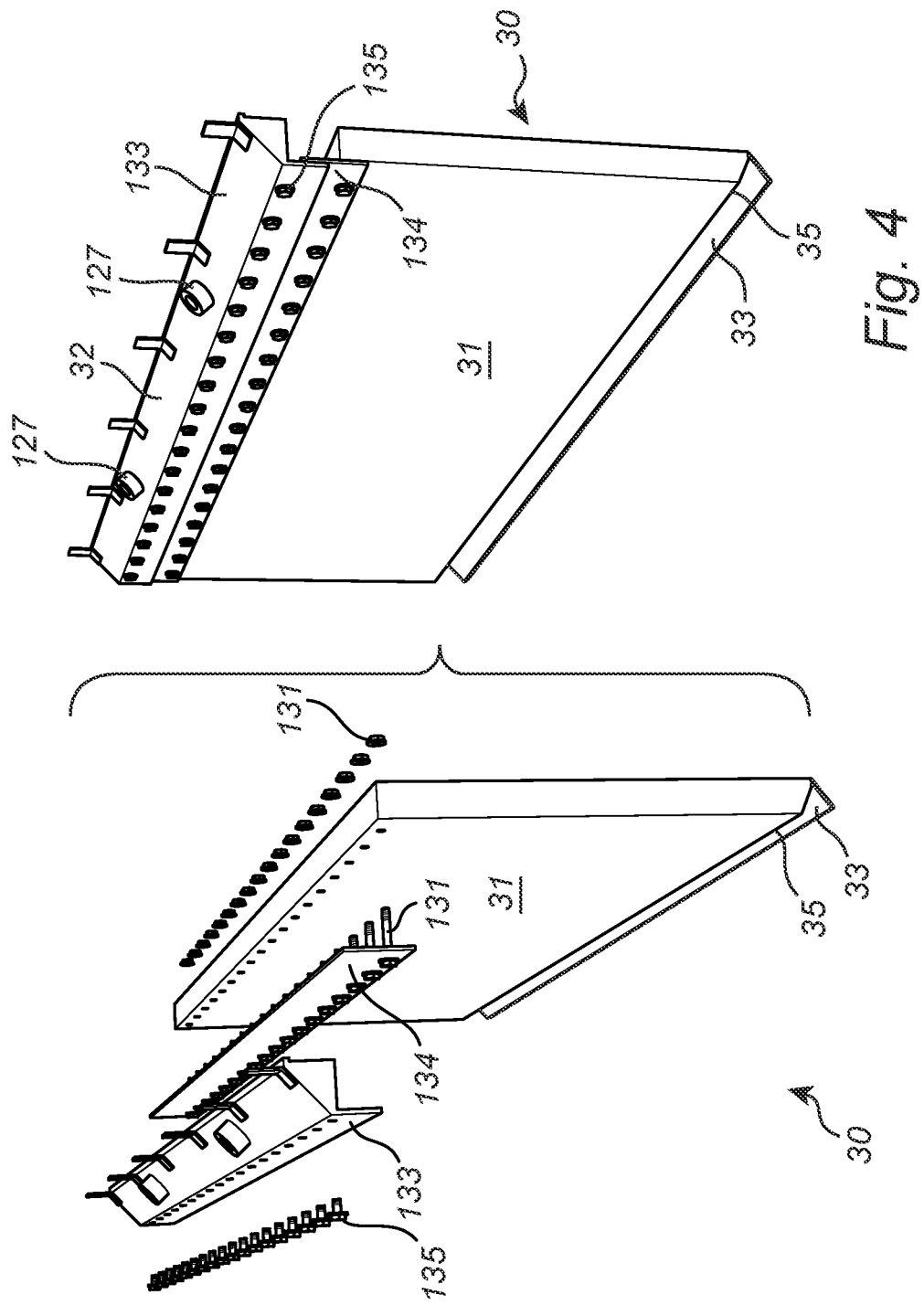

LINING FOR ON-ROAD TRUCK BODY

CROSS-REFERENCE TO RELATED APPLICATIONS

This application is the U.S. national stage application of International Application PCT/EP2020/083205, filed Nov. 24, 2020, which international application was published on Jun. 3, 2021, as International Publication WO 2021/105120 A1 in the English language. The International Application claims priority of Swedish Patent Application 1951343-1, filed Nov. 25, 2019.

FIELD OF THE INVENTION

The present invention relates to truck bed linings, especially on-road truck bed linings and to a method of installing a on-road truck bed lining.

BACKGROUND OF THE INVENTION

When transporting for example rock material, crushed or natural, excavated earth material or other materials using on road trucks during for example infrastructure construction work such as road or tunneling construction, the truck beds are subject to substantial wear during loading, transporting and unloading of the material. Furthermore, infrastructure projects are sometimes performed in or near densely populated areas such that noise occurring during for example loading/unloading may be perceived as bothersome and authorities may issue restrictions regarding noise levels and limitations as to at what time work may be performed. Normally, on-road truck beds are made from steel which causes high noise levels, especially during loading of material using e.g. front loaders or excavators. Further, the truck beds are subjected to excessive wear reducing lifetime of the truck bed.

SUMMARY OF THE INVENTION

An object of the invention is to overcome, or at least lessen the problems involved with prior art on-road truck beds. A particular object is to provide an on-road truck body lining for protecting an on-road truck body from wear and reduce environmental stress, by reducing noise. The on-road truck body lining comprises a plurality of main lining elements and a plurality of edge lining elements arranged to be fixated to the truck body. Each main lining element comprises a load-facing portion and one or more transition sides, each transition side being adapted to meet a corresponding transition side of an adjacent edge lining element of the plurality of edge lining elements and a truck body facing portion which is arranged opposite to said load facing portion. The truck body facing portion comprises one or more end portions which protrude from a respective transition side such that when in use of the on-road truck body lining, the one or more end portions of the truck body facing portion are each arranged to be covered by a respective adjacent edge lining element such that the respective adjacent edge lining element, upon being fixated, clamps the main lining element to the on-road truck body. The use of lining for an on-road truck bed greatly reduces the noise and vibrations during e.g. loading of the truck and it also reduces the amount of carry-back, i.e. the amount of material sticking to the truck bed after unloading. By using the edge lining elements to clamp the main lining elements to the truck bed, it is possible to reduce the number of bolts or other fastening means to mount the lining.

In accordance with an embodiment of the on-road truck body lining, the edge lining elements are arranged to extend over and be fixated to the on-road truck body at edge portions thereof.

In accordance with an embodiment of the on-road truck body lining, edge lining element forms a lining transition between non-parallel main lining elements of said plurality of main lining elements. Edge portions of the truck bed, such as the transition between side wall and bottom wall, are suitable for arranging the edge lining elements since the edge lining element can be designed to cover the transition between e.g. a horizontal bottom wall and a vertical side wall.

In accordance with an embodiment of the on-road truck body lining, the plurality of main lining elements comprises at least one side lining element which is arranged to extend over a side surface of the on-road truck body. The at least one side lining element has one transition side and wherein the at least one side lining element comprises a mounting means for mounting the side lining element to the on-road truck body and wherein the mounting means are arranged distally to the transition side. This solution has the advantage that only the side being distal to the transition side requires dedicated mounting means for mounting the side lining element to the on-road truck body. Therefore, mounting means on the truck bed are also only required at a corresponding location, whereas the transition side of the side lining element is clamped to the truck bed by the edge lining element.

In accordance with an embodiment of the truck body lining, the plurality of main lining elements comprises at least one bottom lining element arranged to extend over a bottom surface of the on-road truck body, wherein the at least one bottom lining element has two transition sides arranged opposed each other and each comprising an end portion protruding from a respective transition side. This allows for the bottom lining elements to be clamped to the truck bed along both end portions, hence no mounting holes are corresponding fastening means at all are required for the bottom lining elements, neither in the bottom lining elements themselves, nor in the bottom part of the truck bed.

In accordance with an embodiment of the truck body lining, the plurality of main lining elements comprises at least one front lining element arranged to extend over a front surface of the on-road truck body, wherein the at least one front lining element has one transition side and wherein the at least one front lining element comprises a mounting means for mounting the at least one front lining element to the on-road truck body, said mounting means being arranged distally to the transition side. Similar to the side lining elements, the front lining element of the present invention reduces the requirements for mounting means, such as bolts and holes for bolts and similar, in the front lining element as such as well as in the truck bed.

In accordance with an embodiment of the truck body lining, the one or more end portions are made from the same material as the load facing portion. This allows for an uncomplicated and less cost intensive manufacturing of the lining element in comparison with previously known solutions.

In accordance with an embodiment of the truck body lining, the load facing portion comprises an elastomer, such as rubber. This makes it easy to adapt the lining element to truck bodies having different shapes. For example, the end portions will easily accommodate the transition from e.g. a horizontal bottom of the truck bed to a vertical side wall or front wall of the truck bed. Often, this transition is achieved by means of an oblique transition edge in the truck bed, for example along an edge which is inclined at approximately 45 degrees to both the side wall and the bottom wall of the truck bed. Such transition edges are provided to reduce so called carry-back, i.e. the amount of material that sticks to the truck bed also after unloading. It is of big importance to reduce the amount of carry-back since it can greatly reduce the transportation capacity of an on-road truck and it has been found that avoiding straight angles between side and bottom walls is one way of achieving this. It should be noted that an inclination of 45 degrees is merely an example and the inclination may vary considerably between different truck beds and may vary depending on the intended material to be transported. The end portions of the present embodiment will be capable to adapt to basically any inclination of such transition edges or any other shapes of the truck body.

In accordance with an embodiment of the truck body lining, a main lining element has at least one connection side adapted to meet a corresponding connection side of an adjacent main lining element, and wherein a connection side forms an oblique angle with a load-facing front surface of the main lining element such that a main lining element partially extends over an adjacent main lining element located rearward thereof. This has the advantage that during unloading of the truck bed, where the transported material slides over the surface of the lining elements, it can be avoided, or at least to a great extent reduced, that the material will hook into the connection side facing forwardly. The current solution creates an obtuse angle between the load-facing front surface of the main lining element and the upstream, or forward, connection side of the same main lining element. Correspondingly, the present invention will create a pointy angle between the load-facing front surface of the main lining element and the downstream, or rearward, connection side of the same main lining element. If perpendicular angles are chosen, the risk is greater that material sliding over the surface during e.g. unloading will hook into and pry open the joint between adjacent lining elements.

In accordance with an embodiment of the truck body lining, each edge lining element comprises a plurality of mounting holes for mounting the edge lining element to the truck body. By arranging the mounting holes in the edge lining elements, the number of mounting means that need to attach to the truck bed can be greatly reduced. Such mounting means comprises e.g. holes in the truck body for bolt and nut connection or bolts welded to the truck body.

In accordance with an embodiment of the truck body lining, at least a sub-set of the plurality of main lining elements comprises one or more recesses arranged on a back side of the main lining elements facing the on-road truck body, so as to provide a cavity between the on-road truck body and the main lining element. This solution has the advantage that the material of the main lining elements will deflect into the cavity when loaded with material to be transported. Then, during unloading of the material, the main lining elements will snap back, again creating a cavity at the rear side. This has the great advantage that any carry-back built up on the lining element will loosen when the element snaps back and can be unloaded together with the rest of the material.

In accordance with an embodiment of the truck body lining, at least a sub-set of the plurality of edge lining elements comprises one or more recesses arranged on a back side thereof facing the truck body, so as to provide a cavity between the truck body and the edge lining element. Similar to the main lining elements, this will greatly reduce the amount of carry-back sticking to the truck bed along the edge areas.

In accordance with an embodiment of the truck body lining, stop plates are attached to the truck body such that said stop body protects a rear connection side of a rearmost main lining element and/or edge lining element. It is advantageous to protect the short side of the rearmost lining elements. Often, on-road trucks are provided with cover doors at the rear end of the truck bed to increase load capacity. If rock material or similar is left between the cover door and rearmost lining elements, the lining elements will otherwise be damaged as the door is closed.

In accordance with an embodiment of the truck body lining, the mounting means of the at least one side lining element is arranged at an upper section of the at least one side lining element distally to the transition side and protrudes away from a load carrying surface of the side lining element. This solution has the advantage that the side lining element can be suspended from the upper edge of the on-road truck body.

In accordance with an embodiment of the truck body lining, a protruding part of the mounting means of the at least one side lining element is arranged to be welded to an upper edge of the on-road truck body. Welding provides a strong, reliable and cheap connection. Bolting is also conceivable.

In accordance with an embodiment of the truck body lining, the mounting means comprises at least two parts which can be disassembled. By providing a mounting means that can be disassembled, replacement of a worn-out lining element is simplified. If one part of the mounting means is welded to the truck body, the lining element can be replaced by disassembly of the mounting means, removing one part connected to the load facing portion and leaving the part welded to the truck body.

In accordance with an embodiment of the truck body lining, the parts of the mounting means are assembled by means of a threaded connection and wherein the load facing portion is attached to one of the parts by means of a bolt and nut connection. Of course, other fastening means such as plug welding, gluing, Velcro etc. can be applied as well.

In accordance with a second aspect of the invention, a method for installing an on-road truck body lining is provided. The method comprises the steps of positioning at least one bottom lining element on the bottom surface of the on-road truck body; positioning at least one side lining element on the side surfaces of the on-road truck body, mounting said plurality of side lining elements to the on-road truck body; positioning at least one front lining element on a front surface of the on-road truck body, mounting said front lining elements to the on-road truck body; positioning a plurality of edge lining elements along edge portions of the on-road truck body such that the plurality of edge lining elements cover one or more end portions of the at least one side lining, said at least one front lining and the at least one bottom lining, and mounting said plurality of edge lining elements to the on-road truck body, such that the plurality of edge lining elements clamps the at least one side lining element, said at least one front lining element and the at least one bottom lining element to the on-road truck body. This has the advantage in comparison with unlined truck beds that noise and vibrations during e.g. loading is greatly reduced. Further, thanks to the use of edge lining elements clamping the side lining elements, the front lining element and bottom lining element to the on-road truck body, the number of mounting means in lining elements and truck body can be greatly reduced. It should be noted that the order in which the bottom lining elements, front lining element and the side lining elements are positioned on the truck body is irrelevant. Important is that they are positioned prior to the edge lining elements which will clamp the bottom lining element, front lining element and the side lining elements to the truck body.

In accordance with an embodiment of the method, a stop plate is attached at or near a rear end of the on-road truck body such that a rear connection side of a rearmost main lining element and/or edge lining element is protected from wear.

In accordance with an embodiment of the method, the at least one side lining elements is mounted to an upper edge of the on-road truck body by means of a mounting means arranged at an upper section of the at least one side lining element.

In accordance with an embodiment of the method, the mounting means arranged at an upper section of the at least one side lining element protrudes away from a load carrying surface of the side lining element. This solution has the advantage that the side lining element can be suspended from the upper edge of the on-road truck body.

In accordance with an embodiment of the method, the mounting means is welded or bolted to the upper edge of the on-road truck body. Welding is a strong, reliable and cost effective way of fastening the lining to the truck body. Bolting has the advantage that it can easily be disassembled and reassembled for e.g. replacing the lining.

In accordance with an embodiment of the method, attachment means are provided at the on-road truck body and wherein the edge lining elements are attached to the on-road truck body by means of these.

In accordance with an embodiment of the method, the attachment means comprises bolts which are welded to the on-road truck body having a centre to centre distance corresponding to that of corresponding openings in the edge lining elements. This solution has the advantage that bolts can be provided in advance such that the edge lining elements can simply be put in place and fastened during installation of the lining.

In accordance with an embodiment of the method, the attachment means comprises a plurality of bolts which are pre-attached to a common fastening plate and having a centre to centre distance corresponding to that of corresponding openings in the edge lining elements, wherein said fastening plate is welded to the on-road truck body. Pre-manufacturing of plates with bolts makes it easy to arrange the bolts with the correct center to center distance. Of course, it is also possible to arrange a single bolt to a single plate and wherein the plate/bolt is attached, by welding, gluing etc., to the truck body with a defined center to center distance.

In accordance with an embodiment of the method, the bottom lining element is provided in a rolled up state to the on-road truck body and during installation the bottom lining element is rolled out. This provides a solution for time effective installation.

In accordance with a third aspect of the invention, an on-road truck body having an on-road truck body lining in accordance with any of the embodiments of the on-road truck body lining described herein or an on-road truck body having an on-road truck body lining installed in accordance with any of the methods described herein is provided.

Other objectives, features and advantages of the present invention will appear from the following detailed disclosure, from the attached claims, as well as from the drawings. It is noted that the invention relates to all possible combinations of features.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise.

As used herein, the term "comprising" and variations of that term are not intended to exclude other additives, components, integers or steps.

BRIEF DESCRIPTION OF THE DRAWINGS

The invention will be described in more detail and with reference to the appended drawings in which:

FIG. 4 shows a schematic view of a front lining element in accordance with an embodiment of the invention.

DESCRIPTION OF EMBODIMENTS

Figure 1:
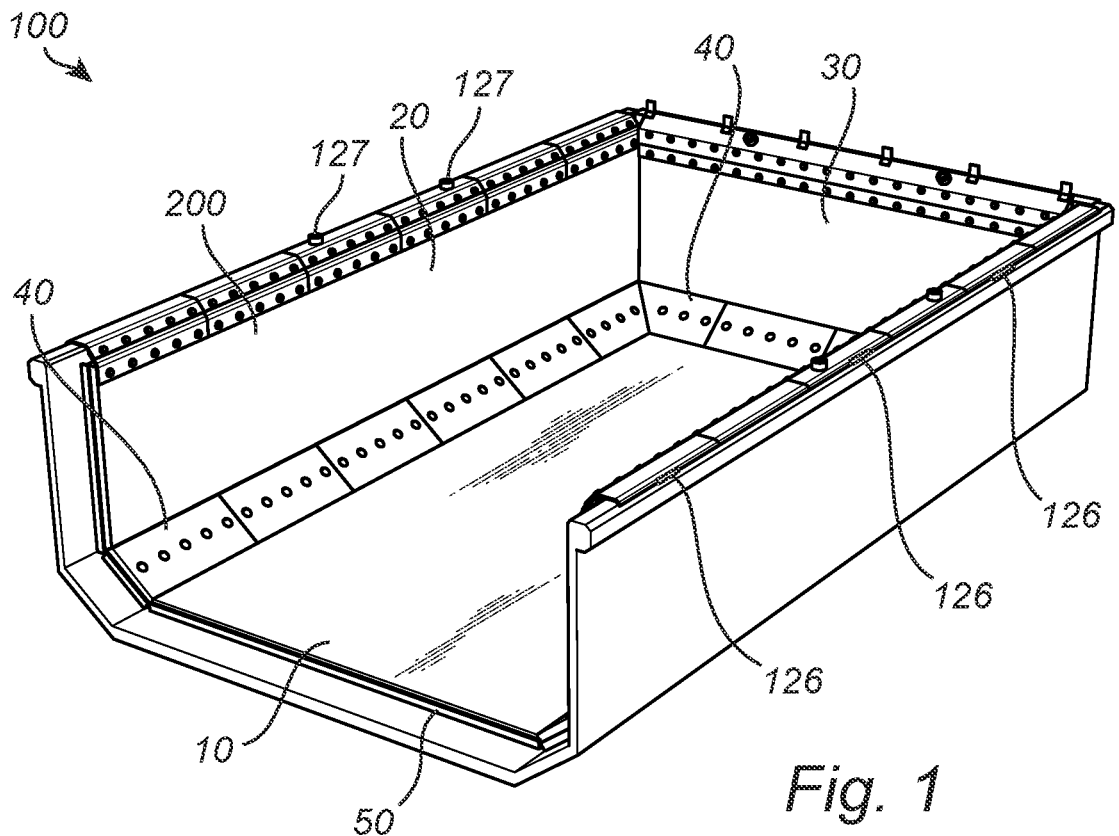
FIG. 1 shows a schematic perspective view of a truck body having a truck body lining in accordance with an embodiment of the invention.

The present invention will now be described more fully hereinafter with reference to the accompanying drawings, in which exemplifying embodiments of the invention are shown. The present invention may, however, be embodied in many different forms and should not be construed as limited to the embodiments set forth herein; rather, these embodiments are provided for thoroughness and completeness, and to fully convey the scope of the invention to the skilled addressee. Like reference characters refer to like elements throughout.

FIG. 1 shows a schematic perspective view of a truck body 100 comprising a lining arrangement 200 covering a major part of the load carrying surfaces of the truck body 100. The lining arrangement 200 comprises among other things a plurality of side lining elements 20, a bottom lining element 10, at least one front lining element 30, a plurality of edge lining elements 40 and at least one stop plate 50. The different parts of the truck body lining will now be discussed in more detail referring to FIGS. 1 through 9.

Figure 2:
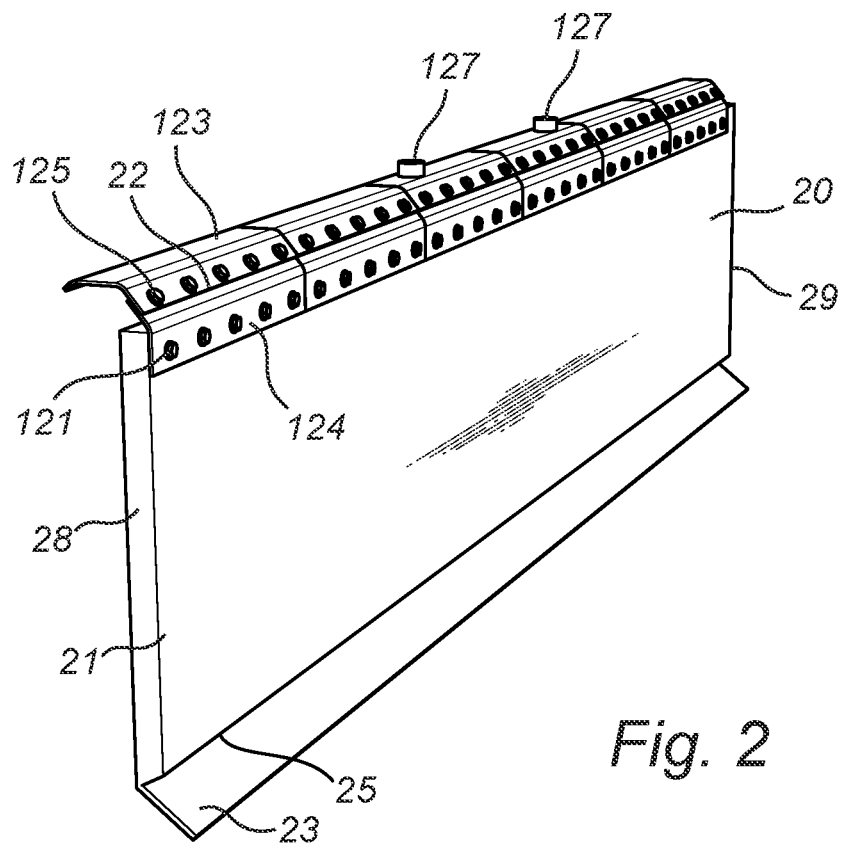
FIGS. 2 and 2a show schematic views of a side lining element in accordance with an embodiment of the invention.
Figure 2A:
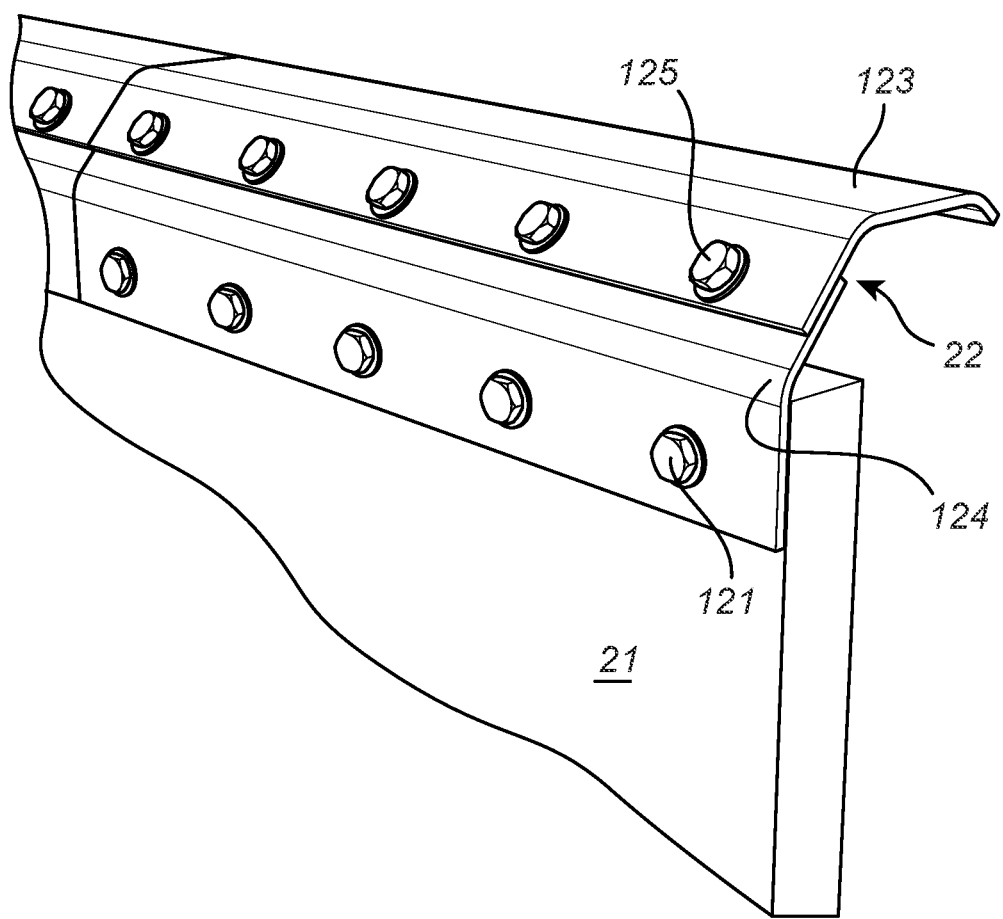
Figure 8:
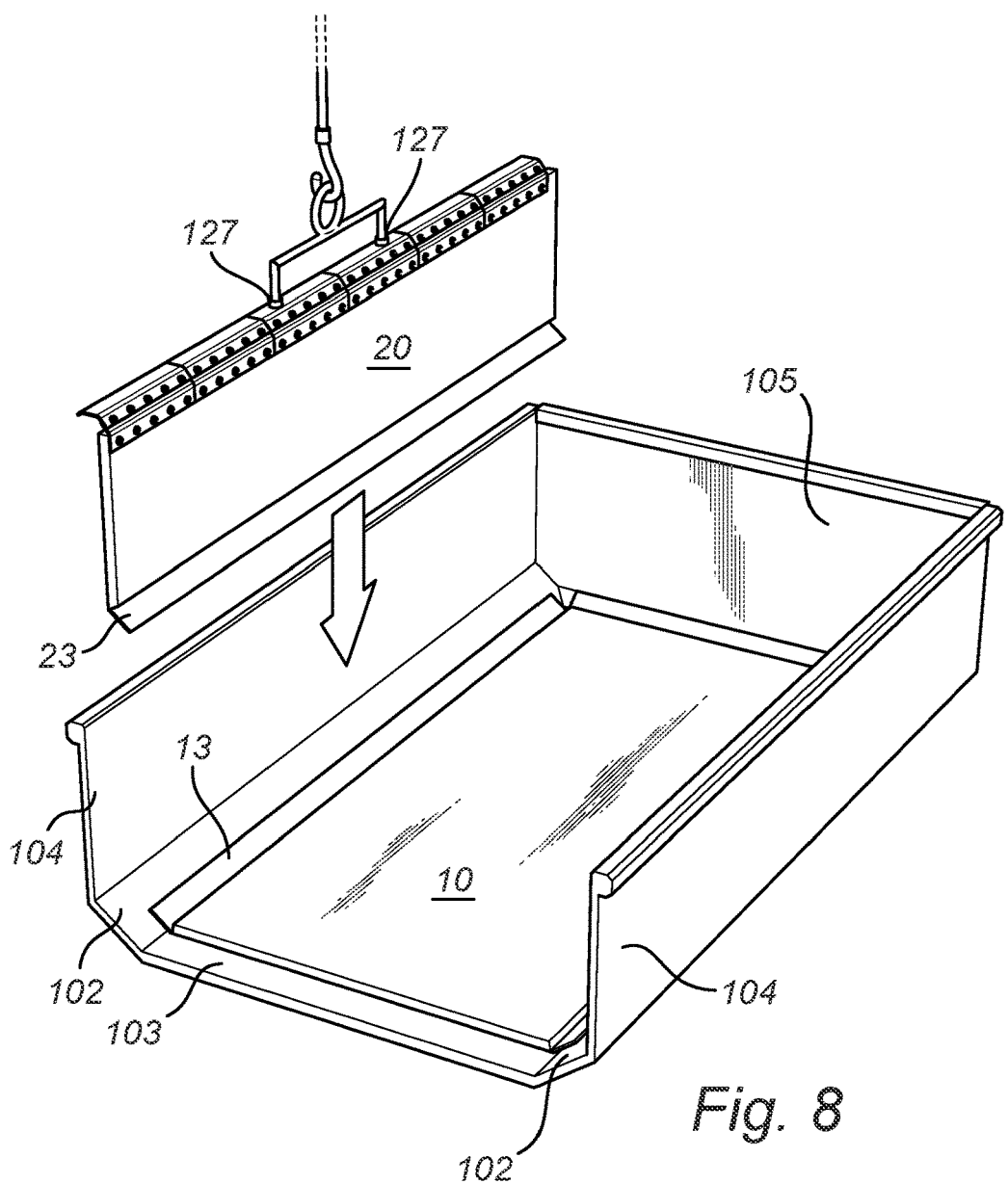
FIG. 8 shows an embodiment of a method for installation of a side lining element in accordance with an embodiment of the invention.

As can be seen in FIGS. 2 and 2a each side lining element 20 comprises a load facing portion 21 and a metal mounting means 22 attached to an upper edge of the load facing portion 21 by any suitable means, in this embodiment a bolt and nut connection 121 is used where the nut and possibly also a washer is arranged at a backside of the load facing portion 21. The side lining element 20 also comprises a transition side 25 adapted to meet and fit with a corresponding transition side 45 of an adjacent edge lining element 40. The load facing portion 21 can be made from rubber, polyurethane or other suitable polymer or other suitable material. An end portion 23 is arranged along the transition 25. The end portion 23 is made from the same material as load facing portion, i.e. rubber, polyurethane or other suitable polymer or other suitable material. This provides for a simple yet reliable construction which has a sufficient structural integrity and at the same time a flexibility required to adapt to different shapes of the truck body. The side lining element 20 further comprises mounting means 22 arranged at an upper side thereof. The mounting means 22 comprises first part 123 and second part 124 connected to each other by means of a threaded connection. The threaded connection comprises bolts 125 which are threaded into openings of the first and second parts 123, 124 having a corresponding thread. Alternatively, only the opening of the second part 124 may be provided with a thread and the opening of the first part 123 may simply have size allowing the bolt to pass through. Further, the load facing portion 21 comprises an down stream connection side 28 and an upstream connection side 29. These connections sides 28, 29 are arranged to meet and fit with an adjacent connection side 28, 29 of an adjacent side lining element. This is particularly relevant when the side lining element comprising a plurality of load facing portions arranged next to each other attached to a common mounting means 22 and the design of these connection sides will be discussed in more detail later, in particular referring to FIG. 9. Referring now to FIGS. 1 and 8 the mounting of side lining element 20 will be discussed. The entire side lining element 20, i.e. a lining for the entire side wall of a on-road truck body can be pre-assembled in a shop. It typically comprises mounting means 22 having at least two parts 123, 124 in the form of metal profiles that are attached to each other by means of a threaded connection. This connection comprises a number of bolts 125 which are threaded into openings in the first and second parts 123, 124 having corresponding threads. Alternatively, only the second part 124 has a threaded opening whereas the opening of the first part 123 only has an opening which lets the bolt pass through. The load facing portion 21 which may be manufactured as a single piece or from a plurality of elements arranged adjacent each other with corresponding connection sides 28, 29 to form a lining for the on-road truck body. The load facing portion 21 may in both cases be made from rubber, polyurethane or other suitable material. The load facing portion 21 may be attached to the mounting means 22 by means of a bolt and nut connection 121, possibly also using washers at both sides. When the side lining element is assembled, it can be lifted into place on the on-road truck body 100 by means of a crane or similar and can be suspended from the upper edge of the on-road truck body by means of the outwardly protruding first part 123 of the mounting means 22. As the side lining element is thus temporarily arranged at the upper edge of the truck body, the first part 123 of the mounting means 22 is firmly attached to the truck body by means of welds 126. The welds may be intermittent or run along the whole or at least a major part of the length of the upper edge of the truck body 100. A bolted connection is also conceivable and rivets may also be used. The fact that the entire side lining element 20 can be pre-assembled in advance provides for a quick installation at the truck body. Hoisting means 127 by means of which a crane or similar can be attached to side lining element 20 may be provided along an upper rim of the mounting means 22.

Figure 3:
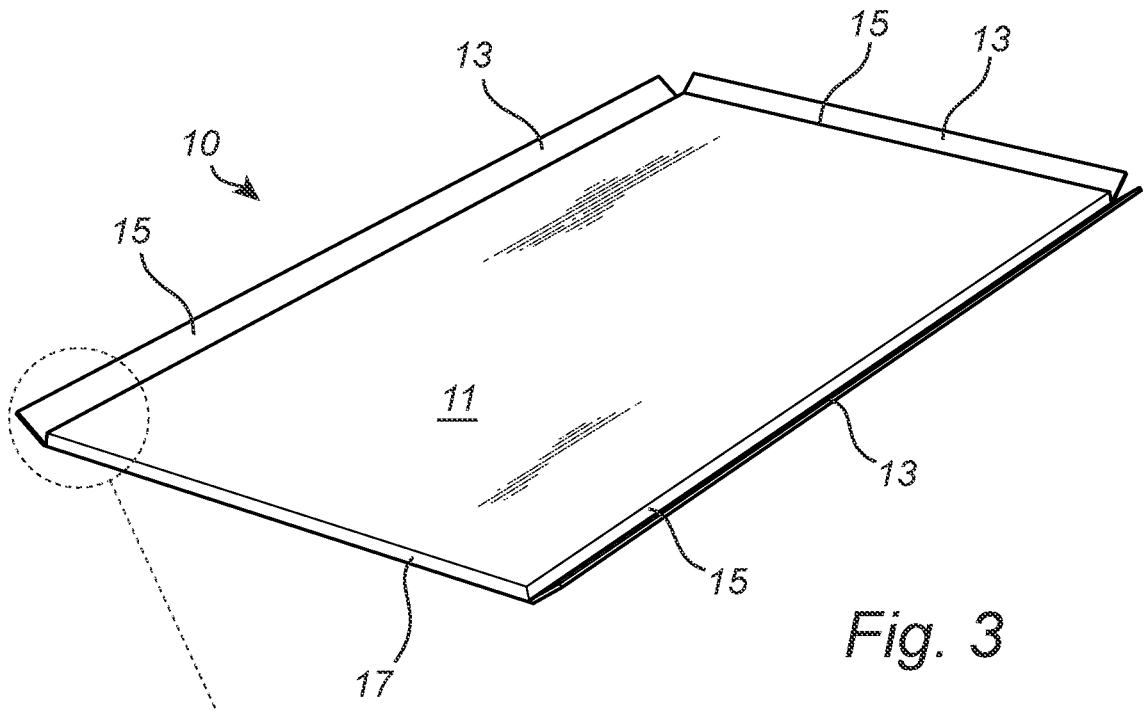
FIGS. 3 and 3a show schematic views of a bottom lining element in accordance with an embodiment of the invention.
Figure 3A:
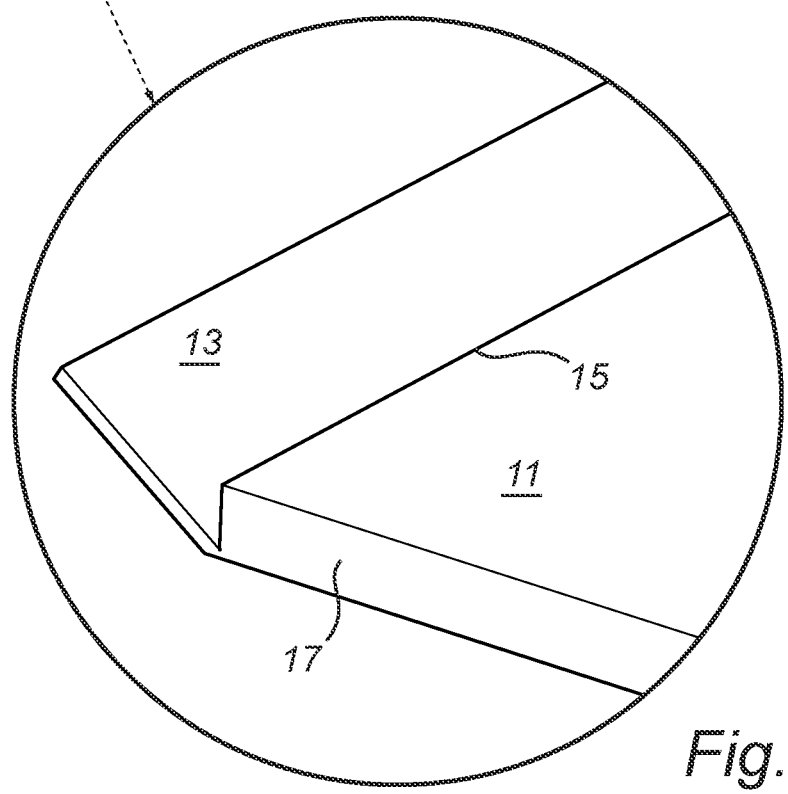
Figure 5:
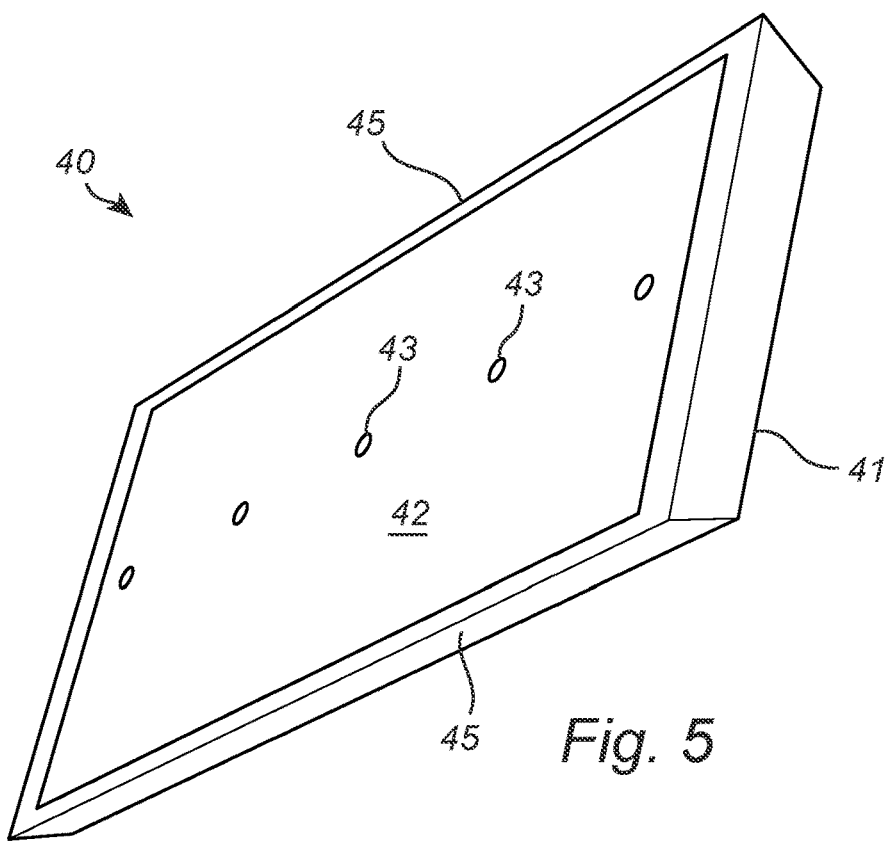
FIG. 5 shows an edge lining element in accordance with an embodiment of the invention.
Figure 6:
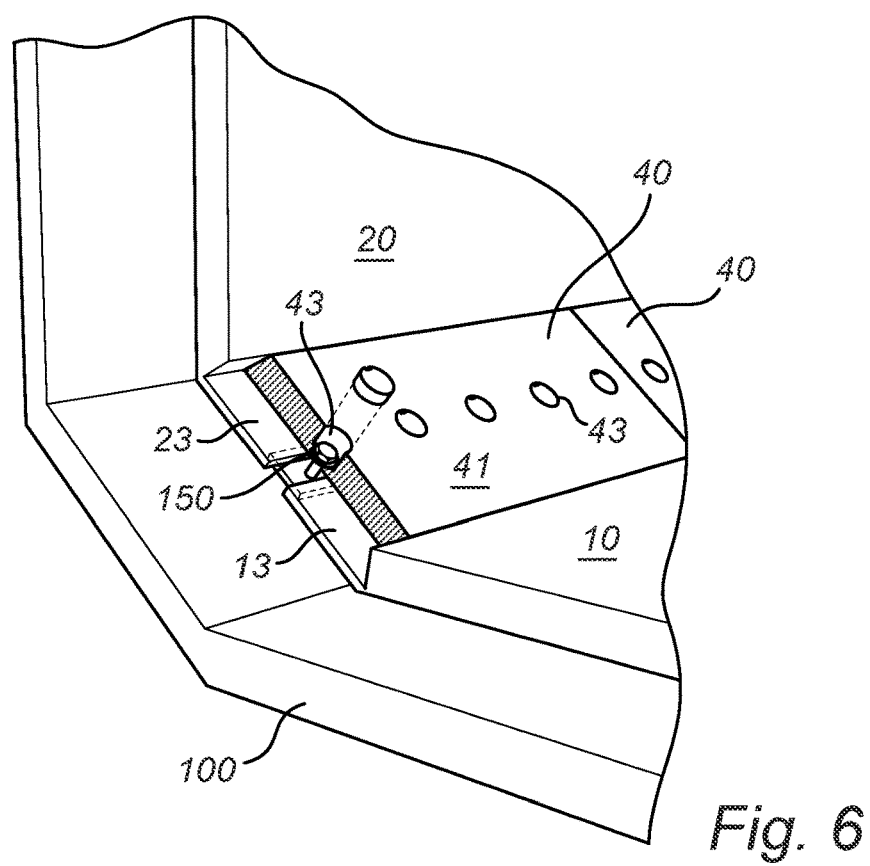
FIG. 6 shows a detail of an embodiment of the invention.

Referring now to FIGS. 3 and 3a, the bottom lining elements 10 will be discussed. It comprises a load-facing portion 11. The load facing portion 11 can be made from rubber, polyurethane or other suitable polymer or other suitable material. The load facing portion 11 is provided with three transition sides 15, each transition side 15 being adapted to meet and fit with a corresponding transition side 45 of an adjacent edge lining element 40. The bottom lining element 10 also has three end portions 13 protruding in a flange-like manner from the load facing portion 11 and being adaptable to the shape of the on-road truck body 10. This ensures that the end portions 13 will fit to the surface of the truck body also at an inclined edge portion thereof. Further, the bottom lining element 10 comprises a down stream connection side 17 arranged to meet and fit with a stop plate 50 of the truck body. In this embodiment, the bottom lining element 10 comprises a single element covering the entire bottom surface of a truck body. The bottom lining element 10 may be provided to a shop in the form of a rolled-up element and lifted by means of e.g. a fork lift onto the rear end of truck body 100. When in place, the rolled-up bottom lining element 10 may simply be rolled out to cover the bottom surface of the truck body. In an alternative embodiment, the bottom lining comprises a plurality of bottom lining elements 10, each covering the entire width of the bottom surface of the truck body but only a part of the length thereof. A plurality of bottom lining elements 10 may be arranged next to each other and each having a downstream connection side 17 and an upstream connection side 18. These connections sides are arranged to meet and fit with an adjacent connection side 17, 18 of an adjacent bottom lining element. See in this respect also FIG. 9.

At least one front lining element 30 is also provided. This front lining element 30 will have substantially the same properties as the side lining elements. It comprises a load facing portion 31, a transition side 35 adapted to meet and fit with a corresponding transition side 45 of an adjacent edge lining element 40. An end portion 33 is arranged along the transition 35. The end portion 33 is made from the same material as load facing portion, i.e. rubber, polyurethane or other suitable polymer or other suitable material. This provides for a simple yet reliable construction which has a sufficient structural integrity and at the same time a flexibility required to adapt to different shapes of the truck body. It further comprises mounting means 32 arranged to be attached by means of welding or bolting to a front surface of the truck body 100. Similar to the side lining elements 20, the mounting means 32 of the front lining element 30 comprises at least a first and a second part 133, 134 attached to each other by means of a threaded connection using bolts threaded into openings of the first and second parts 133, 134. The load facing portion 31 is attached to the second part 134 by means of a bolt and nut connection 131. The front lining element 30 can be pre-assembled in a shop and simply be lifted in place on the truck body and attached thereto along an upper part of the front wall of the truck body by means of mounting means 32. Welding, bolted connection or rivets may be used.

A plurality of edge lining elements 40 are also provided. These edge lining elements 40 can be best seen in FIGS. 5 and 6. They are also made from rubber, polyurethane or other suitable polymer or other suitable lining material and may also comprise a reinforcement plate 42 arranged at the rear side, i.e. the side facing the truck body and may be made from metal or similar. The edge lining elements 40 comprises transition sides 45, substantially extending along the long sides thereof. These transition sides 45 are adapted to meet and fit with the transition sides 15, 25, 35 of the bottom lining elements 10, side lining elements 20 and front lining elements 30, as the case may be. The transition sides 45 may have an inclination as required by the shape of the main lining elements and the inclination of the edge portion. The edge lining elements 40 further comprises one or more mounting holes 43 for attachment thereof to the truck body by attachment means 150, e.g. bolts or rivet nuts. Further, sealing plugs 44 may be provided to cover the holes 43 to avoid wear and tear in the holes 43 during use.

Figure 7:
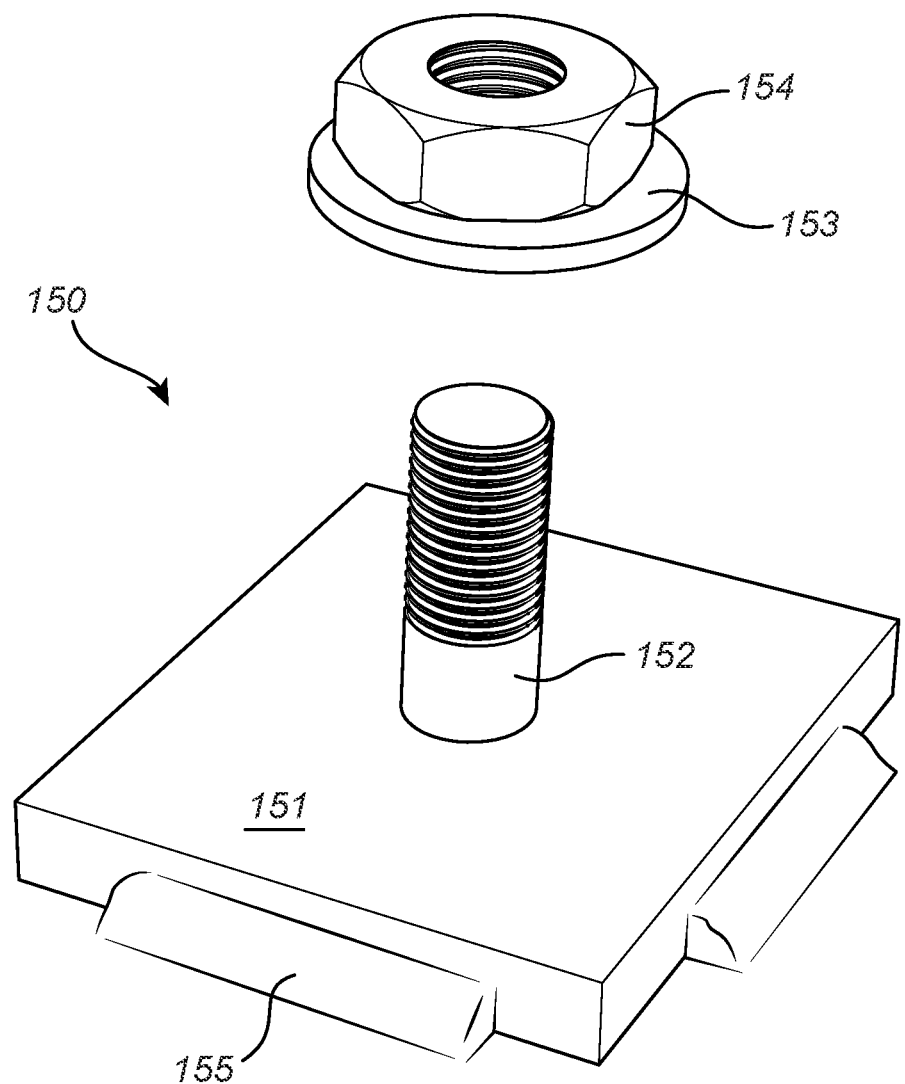
FIG. 7 shows a detail of a fastening means in accordance with an embodiment of the invention.

FIG. 7 discloses the attachment means 150 which may be provided in the form of individual bolts 152 attached to a fixing plate 151 which is arranged to be welded 155 to the surface of the truck body 100 at centre to centre distance corresponding to that of the holes 43 of the edge lining elements 40. Washer 153 and nut 154 is used for fastening the edge lining element 40 to the truck body. In an alternative embodiment, an elongated fixing plate 151 is provided onto which a plurality of bolts 152 are attached with a suitable centre to centre distance. At installation, the plate, which may even have a length corresponding to that of the truck body is arranged at the surface of the truck body and attached, e.g. by welding, thereto.

Figure 9:
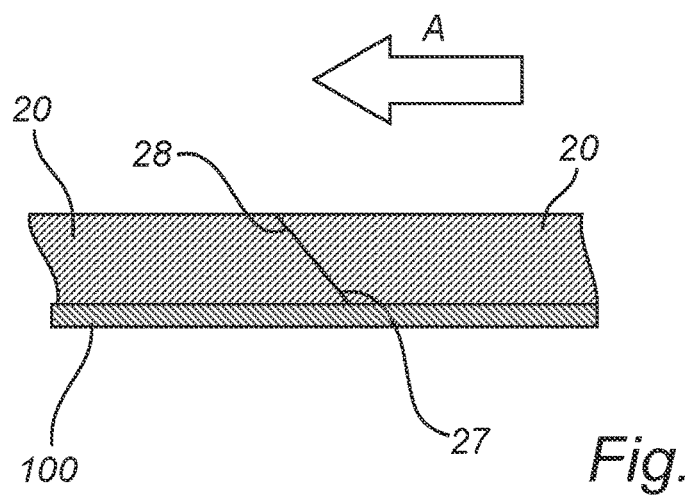
FIG. 9 shows a detail of a lining element in accordance with an embodiment of the invention.

A preferred embodiment of the main and edge lining elements can be seen in FIG. 9. An upstream side lining element 20 will be shaped at a pointy angle between its downstream connection side 27 and load facing surface whereas a downstream side lining element 20 will be shaped at an obtuse angle between its upstream connection side 28 and load facing surface. The will create an overlap of the upstream side lining element over the downstream side lining element. This has the advantage that as material slide over the load facing surface of the side lining elements during unloading, generally in the direction of the arrow A in FIG. 9, it is avoided that material pry the joint between two adjacent side lining elements 20 open. That would escalate wear of the lining elements and would also create material build-up and increase carry-back issues. Even though this overlapping solution has been described with respect to side lining elements, the same solution can be applied to other lining elements of the invention, e.g. adjacent bottom lining elements and adjacent edge lining elements.

A suggested way of mounting the on-road truck body lining of the present invention will now be described in relation to the figures. First, attachment means 150 are provided the truck body. These are preferably provided along an edge portion 102 extending along a transition between bottom wall 103 and side walls 104 as well as between bottom wall 103 and front wall 105. Typically, this edge portion 102 is inclined towards the side walls 104, front wall 105 and bottom wall 103. The immediate transitions from bottom wall to edge portion, from side wall to edge portion and front wall to edge portion are provided in a smooth manner having a suitable radius. Any sharp edges will increase the risk of material build up and should be avoided. Then, the front lining element 30 may be attached to the truck body 100 by means of e.g. welding or bolts extending by means of mounting means 32 along an upper edge of the front lining element. No mounting means are provided along the side edges or lower edge of the front lining element 30. Next, the bottom lining elements 10 is arranged on the bottom wall 103 of the truck body 100. It should be noted that no drilling or similar in the bottom wall 103 is required with the present invention and hence, no bolting of the bottom lining element 10 is required. When the bottom lining element 10 has been arranged, the two side lining elements 20 are arranged along the side walls 104 of the truck body 100. These are attached e.g. by welding or bolting using the mounting means 22 arranged along an upper edge of the side lining elements 20. Front and side lining elements 30, 20 may be hoisted in place using a crane attached to hoisting means 127 and bottom lining element 10 can be lifted onto the truck body in a rolled up condition using a fork lift and simply rolled out on the truck body. When this has been done, edge lining elements 40 are arranged bridging over between bottom lining elements 10 and side lining elements 20 as well as between bottom lining elements 10 and front lining element 30. The bottom lining elements 10, the side lining elements 20 and the front lining element 30 all comprise flange-like end portions 13, 23, 33 which extend into edge portion 102 of the truck body 100. As the edge lining elements 40 are arranged and mounted by means of e.g. attachment means 150 to the edge portion 102, the bottom lining elements 10, the side lining elements 20 and the front lining element 30 will all be clamped to the truck body 100. This solution has a great advantage in that it does not require drilling of individual mounting holes in load facing portion and the truck body for the parts of bottom lining elements 10, the side lining elements 20 and the front lining element 30 extending into the edge portion 102. Instead, it is sufficient to provide one set of attachment means 150 for the edge lining elements 40 only. The finished lining can be seen in FIG. 1, where the single line of attachment means in the edge portion 102 can be seen. Here, stop plates 50 can also be seen. These are preferably arranged along a down stream connection side of the rear-most side-, bottom- and edge lining elements. They are advantageous in that they protect the lining elements from being damaged when a cover door of the truck body 100 is closed and there is still material left which will otherwise be pressed towards the lining elements 10, 20, 40, thus increasing wear.

When side or front lining needs to be replaced due, the mounting means 22, 32 provides a major advantage. This since the first and second parts 123, 124, 133, 134 can be split by opening the connections between the two parts. Thereafter, the load facing portion and the second part 124, 134 can be removed and replaced without having to remove the first part 123, 133 which typically is harder to remove due to welded connection. Removal of the load facing portion 21, 31 is also conceivable but since it is usually made from rubber or similar and have an inherent lack of rigidity it will be easier to handle having a second part 123, 133 attached thereto. It may also be complicated to access the rear side of the load facing portion 21, 31 to remove and replace the nuts of the bolt and nut connection 121. Since the openings of the second part 123, 133 has internal threads, this is not a problem using the split mounting means 22, 32 of the invention.

The skilled person realizes that a number of modifications of the embodiments described herein are possible without departing from the scope of the invention, which is defined in the appended claims. For example, the number and size of individual lining elements; the number of mounting holes; the size of openings in reinforcement plates; and thickness of load facing portions indicated in the drawings are only intended as examples and are in no way limiting. Further, and as mentioned earlier, the order in which the main lining elements are positioned on the truck bed is irrelevant. Important is that bottom, side and front lining elements are positioned prior to the positioning and fastening of the edge lining elements. This since the latter will clamp the main lining elements to the truck bed. Further, the load facing portion of a lining element may comprise a recess on the back side thereof. This recess creates a cavity between the load facing portion and the outer surface of the on-road truck body. When the truck is loaded with material to be transported, such as gravel or similar, the material of the load facing portion will deflect into the recess. Then, as the material is unloaded, the material of the load facing portion will spring or snap back again and resume its original shape. This will cause any material build-up to loosen from the side lining element, thus avoiding the problem of carry-back. This is a problem which greatly reduces the total transportation capacity.

Further, the term on-road truck has been used throughout the application. Other terms are used in the field, such as road truck, infrastructure truck, lorry etc. and these are covered by the invention as well.

The invention claimed is:

1. An on-road truck body lining for protecting an on-road truck body from wear, said on-road truck body lining comprising:
   a plurality of main lining elements, and
   a plurality of edge lining elements arranged to be fixated to the on-road truck body to form a lining transition between non-parallel main lining elements, each main lining element comprising:
   a load facing portion
   one or more transition sides, each transition side being adapted to meet a corresponding transition side of an adjacent edge lining element of the plurality of edge lining elements, and
   a truck body facing portion, arranged opposite to said load facing portion, said truck body facing portion comprising one or more end portions protruding from a respective transition side of the load facing portion such that, in use of the on-road truck body lining, the one or more end portions of the truck body facing portion are each arranged to be covered by a respective adjacent edge lining element such that said respective adjacent edge lining element, upon being fixated, clamps the main lining element to the on-road truck body.

2. The on-road truck body lining according to claim 1, wherein the edge lining elements are arranged to extend over and be fixated to the on-road truck body at edge portions thereof.

3. The on-road truck body lining according to claim 1, wherein the plurality of main lining elements comprises at least one side lining element arranged to extend over a side surface of the on-road truck body, wherein the at least one side lining element has one transition side and wherein the at least one side lining element comprises a mounting means for mounting the side lining element to the on-road truck body, said mounting means being arranged distally to the transition side.

4. The on-road truck body lining according to claim 1, wherein the plurality of main lining elements further comprises at least one bottom lining element arranged to extend over a bottom surface of the on-road truck body, wherein the at least one bottom lining element has two transition sides arranged opposed to each other and each comprising an end portion protruding from a respective transition side.

5. The on-road truck body lining according to claim 1, wherein the plurality of main lining elements comprises at least one front lining element arranged to extend over a front surface of the on-road truck body, wherein the at least one front lining element has one transition side and wherein the at least one front lining element comprises a mounting means for mounting the at least one front lining element to the on-road truck body, said mounting means being arranged distally to the transition side.

6. The on-road truck body lining according to claim 1, wherein the one or more end portions are made from the same material as the load facing portion.

7. The on-road truck body lining according to claim 1, wherein the load facing portion comprises an elastomer, such as rubber.

8. The on-road truck body lining according to claim 1, wherein a main lining element has at least one connection side adapted to meet a corresponding connection side of an adjacent main lining element, and wherein a connection side forms an oblique angle with a load-facing front surface of the main lining element such that a main lining element partially extends over an adjacent main lining element located rearward thereof.

9. The on-road truck body lining according to claim 1, wherein each edge lining element comprises a plurality of mounting holes for mounting the edge lining element to the on-road truck body.

10. The on-road truck body lining according to claim 1, wherein at least a sub-set of the plurality of main lining elements comprises one or more recesses arranged on a back side of the main lining elements facing the on-road truck body, so as to provide a cavity between the on-road truck body and the main lining element.

11. The on-road truck body lining according to claim 1, wherein at least a sub-set of the plurality of edge lining elements comprises one or more recesses arranged on a back side thereof arranged to face the on-road truck body, so as to provide a cavity between the on-road truck body and the edge lining element.

12. The on-road truck body lining according to claim 1, wherein stop plates are attached to the on-road truck body such that said stop body protects a rear connection side of a rearmost main lining element and/or edge lining element.

13. The on-road truck body lining according to claim 3, wherein the mounting means of the at least one side lining element is arranged at an upper section of the at least one side lining element distally to the transition side and protrudes away from a load carrying surface of the side lining element.

14. The on-road truck body lining according to claim 13, wherein a protruding part of the mounting means of the at least one side lining element is arranged to be welded to an upper edge of the on-road truck body.

15. The on-road truck body lining according to claim 3 wherein the mounting means comprises at least two parts which can be disassembled.

16. The on-road truck body lining according to claim 15 wherein the parts of the mounting means assembled by means of a threaded connection and wherein the load facing portion is attached to one of the parts by means of a bolt and nut connection.

17. A method for installing an on-road truck body lining, the method comprising:
   positioning at least one bottom lining element on the bottom surface of the on-road truck body;
   positioning at least one side lining element on the side surfaces of the on-road truck body, mounting said plurality of side lining elements to the on-road truck body;
   positioning a plurality of edge lining elements along edge portions of the on-road truck body such that the plurality of edge lining elements form a lining transition between the non-parallel at least one bottom lining element and at least one side lining element, wherein the plurality of edge lining elements cover one or more end portions of the at least one side lining elements and the at least one bottom lining element, and mounting said plurality of edge lining elements to the on-road truck body, such that the plurality of edge lining elements clamps the at least one side lining element and the at least one bottom lining elements to the on-road truck body.

18. The method according to claim 17, wherein a stop plate is attached at or near a rear end of the on-road truck body such that a rear connection side of a rearmost main lining element and/or edge lining element is protected from wear.

19. The method according to claim 17, wherein the at least one side lining elements is mounted to an upper edge of the on-road truck body by means of a mounting means arranged at an upper section of the at least one side lining element.

20. The method according to claim 19, wherein the mounting means arranged at an upper section of the at least one side lining element protrudes away from a load carrying surface of the at least one side lining element.

21. The method according to claim 20, wherein the mounting means is welded or bolted to the upper edge of the on-road truck body.

22. The method according to claim 17, wherein attachment means are provided at the on-road truck body and wherein the plurality of edge lining elements are attached to the on-road truck body by means of these.

23. The method according to claim 22, wherein the attachment means comprises bolts which are welded to the on-road truck body having a centre to centre distance corresponding to that of corresponding openings in the edge lining elements.

24. The method according to claim 23, wherein the attachment means comprises a plurality of bolts which are pre-attached to a fastening plate and having a centre to centre distance corresponding to that of corresponding openings in the edge lining elements, wherein said fastening plate is welded to the on-road truck body.

25. The method according to claim 17, wherein the at least one bottom lining element is provided in a rolled up state to the on-road truck body and during installation the at least one bottom lining element is rolled out.

26. An on-road truck body comprising an on-road truck body lining in accordance with claim 1.

* * * * *